United States Patent
Suzuki et al.

(10) Patent No.: US 6,871,670 B2
(45) Date of Patent: Mar. 29, 2005

(54) METAL BELLOWS ACCUMULATOR

(75) Inventors: Kenichi Suzuki, Nishikamo-gun (JP); Yasuo Takahara, Anjo (JP); Hiroshi Kondo, Chiryu (JP); Toshihiko Kawamura, Toyoake (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/492,415

(22) PCT Filed: May 28, 2003

(86) PCT No.: PCT/JP03/06638

§ 371 (c)(1),
(2), (4) Date: Apr. 12, 2004

(87) PCT Pub. No.: WO03/100262

PCT Pub. Date: Dec. 4, 2003

(65) Prior Publication Data

US 2004/0244857 A1 Dec. 9, 2004

(30) Foreign Application Priority Data

May 29, 2002 (JP) ....................... 2002-155383

(51) Int. Cl.[7] ............................... F16L 55/04
(52) U.S. Cl. ............................. 138/30; 138/31; 138/26; 220/721; 303/87
(58) Field of Search .................... 138/30, 31, 26; 220/721, 720, 723; 303/10, 11, 85, 87

(56) References Cited

U.S. PATENT DOCUMENTS 3,159,182 A * 12/1964 Peters ........................ 138/30
4,213,545 A * 7/1980 Thompson et al. ........ 222/386.5
4,997,009 A * 3/1991 Niikura et al. ............... 138/30
6,494,545 B2 * 12/2002 Nakamura et al. ........... 303/87
6,644,354 B2 * 11/2003 Dinkel et al. ................ 138/30
6,789,576 B2 * 9/2004 Umetsu et al. .............. 138/30
6,805,166 B2 * 10/2004 Suzuki et al. ................ 138/31

FOREIGN PATENT DOCUMENTS

| EP | 0 391 320 A1 | 10/1990 |
| JP | 2-266101 | 10/1990 |
| JP | 3-41201 | 4/1991 |
| JP | 3-88001 | 9/1991 |
| JP | 2001-116003 | 4/2001 |

* cited by examiner

*Primary Examiner*—Patrick Brinson
(74) *Attorney, Agent, or Firm*—Burns, Doane, Swecker & Mathis, L.L.P.

(57) ABSTRACT

In a metal bellows accumulator, a metallic bellows unit is disposed within a pressure space defined in a main shell, and one end of the metallic bellows unit is fixedly secured to one end wall of the main shell. The metallic bellows unit sections the pressure space into an outer chamber serving as a gas chamber in which a pressurized gas is enclosed, and an inner chamber serving as a liquid chamber communicating with a liquid port formed in the end wall of the main shell. A stopper (auxiliary shell) for limiting collapsing movement of the metallic bellows unit is disposed within the liquid chamber and has a communication passage hole. The liquid port always communicates with a liquid chamber to which an inner circumferential surface of a bellows portion of the metallic bellows unit is exposed via the communication passage hole.

8 Claims, 3 Drawing Sheets

METAL BELLOWS ACCUMULATOR

TECHNICAL FIELD

The present invention relates to a hydraulic accumulator for accumulating a pressurized liquid, and more particularly to a metal bellows accumulator whose interior is sectioned by means of a metallic bellows unit into a gas chamber, in which a pressurized gas is enclosed, and a liquid chamber communicating with the exterior.

BACKGROUND ART

A certain conventional hydraulic accumulator of the described type includes a shell defining a pressure space, and a metallic bellows unit which is disposed within the pressure space and whose one end is fixedly secured to an end wall of the shell. The metallic bellows unit sections the pressure space into an outer chamber serving as a gas chamber, in which a pressurized gas is enclosed, and an inner chamber serving as a liquid chamber communicating with a liquid port formed in the end wall of the shell. This conventional hydraulic accumulator is disclosed in, for example, Japanese Patent Application Laid-Open (kokai) No. 2001-116003.

In the hydraulic accumulator disclosed in the above-identified publication, when the liquid chamber is opened to the atmosphere, the gas pressure enclosed in the gas chamber acts on the outer side of the collapsed metallic bellows unit and the atmospheric pressure acts on the inner side of the collapsed metallic bellows unit, whereby a considerably large differential pressure acts on the metallic bellows unit. Such differential pressure shortens the life of the metallic bellows unit. In order to suppress possible shortening of the life of the metallic bellows unit, this known hydraulic accumulator employs a sealing structure for preventing the atmospheric pressure from acting on the inner side of the bellows portion of the metallic bellows unit.

However, in the above-described sealing structure, there is a fear that a sealing member that is seated on a seal seat when the liquid chamber is opened to the atmosphere may be fixed to the seal seat and be difficult to separate from the seal seat. In this event, there would be a fear that, since the metallic bellows unit does not smoothly expand, the pressure of pressurized liquid may reach a preset upper limit before a predetermined amount of pressurized liquid is accumulated in the liquid chamber. As a result, the hydraulic accumulator may fail to reliably accumulate pressurized liquid.

DISCLOSURE OF THE INVENTION

In view of the above-described problems, an object of the present invention is to provide a hydraulic accumulator that guarantees smooth expansion of a metallic bellows unit and is hence capable of reliably accumulating pressurized liquid.

In order to achieve the above object, the present invention provides a metal bellows accumulator including a shell which defines a pressure space, and a metallic bellows unit which is disposed within the pressure space of the shell and whose one end is fixedly secured to an end wall of the shell. The metallic bellows sections the pressure space into an outer chamber serving as a gas chamber in which a pressurized gas is enclosed, and an inner chamber serving as a liquid chamber which communicates with a liquid port formed in the end wall of the shell and in which a pressurized liquid is to be accumulated via the liquid port. The metal bellows accumulator further includes a stopper for limiting collapsing movement of the metallic bellows unit. The stopper is disposed within the liquid chamber. The liquid port always communicates with a liquid chamber to which an inner circumferential surface of a bellows portion of the metallic bellows unit is exposed via a communication passage.

In the hydraulic accumulator according to the present invention, because the stopper for limiting the collapsing movement of the metallic bellows unit is disposed within the liquid chamber, overcollapsing of the metallic bellows unit is prevented, so that possible shortening of the life of the metallic bellows unit can be prevented, thereby securing a required life of the metallic bellows unit.

Further, because the liquid port always communicates with a liquid chamber to which an inner circumferential surface of a bellows portion of the metallic bellows unit is exposed via a communication passage, it is unnecessary to employ a sealing structure for preventing the atmospheric pressure from acting on the inner side of the bellows portion of the metallic bellows unit. Accordingly, in any case, the above-described problems attributable to the sealing structure (i.e., the problems resulting from the fixedly seating of a sealing member to a seal seat) do not arise and, therefore, the metallic bellows unit is allowed to expand smoothly so that, so long as the pressurized liquid is accumulated in less than a predetermined amount, the pressure of the pressurized liquid does not reach a preset threshold. As a result, the hydraulic accumulator can accumulate the pressurized liquid reliably.

Preferably, the stopper is constituted by a bottomed tubular member having an open end fixed to the end wall of the shell and a bottom wall which engages a plate portion of the metallic bellows unit so as to limit collapsing movement of the metallic bellows unit. The tubular member sections the liquid chamber into an inner liquid chamber portion communicating with the liquid port and an outer liquid chamber portion to which the inner circumferential surface of the bellows portion of the metallic bellows unit is exposed. A communication passage hole for connecting the inner liquid chamber portion and the outer liquid chamber portion is formed in the bottom wall of the tubular member. A rubber member is disposed between the plate portion of the metallic bellows unit and the bottom wall of the tubular member. The rubber member is configured and arranged in order to maintain the connection between the inner liquid chamber portion and the outer liquid chamber portion even when the plate portion of the metallic bellows unit comes into contacts with the bottom wall of the tubular member.

The pressure of the pressurized gas enclosed in the gas chamber is preferably set within a range of 2 to 9 MPa.

In this case, when the hydraulic accumulator is applied to a brake system of an automobile, it is possible to secure not only an initial braking force (because the gas pressure is set to a value equal to or greater than 2 MPa) but also a required life of the metallic bellows unit (because the gas pressure is set to a value equal to or smaller than 9 MPa).

Preferably, the bellows portion of the metallic bellows unit includes a plurality of pleats each having a S-shaped cross section. In this case, as compared with the case where the bellows portion of the metallic bellows unit includes a plurality of pleats each having a U-shaped cross section, a minimum pitch (i.e., a pitch when the bellows portion is collapsed) of the pleats can be reduced and, therefore, the hydraulic accumulator can be manufactured compactly.

BEST MODE FOR CARRYING OUT THE INVENTION

Figure 1:
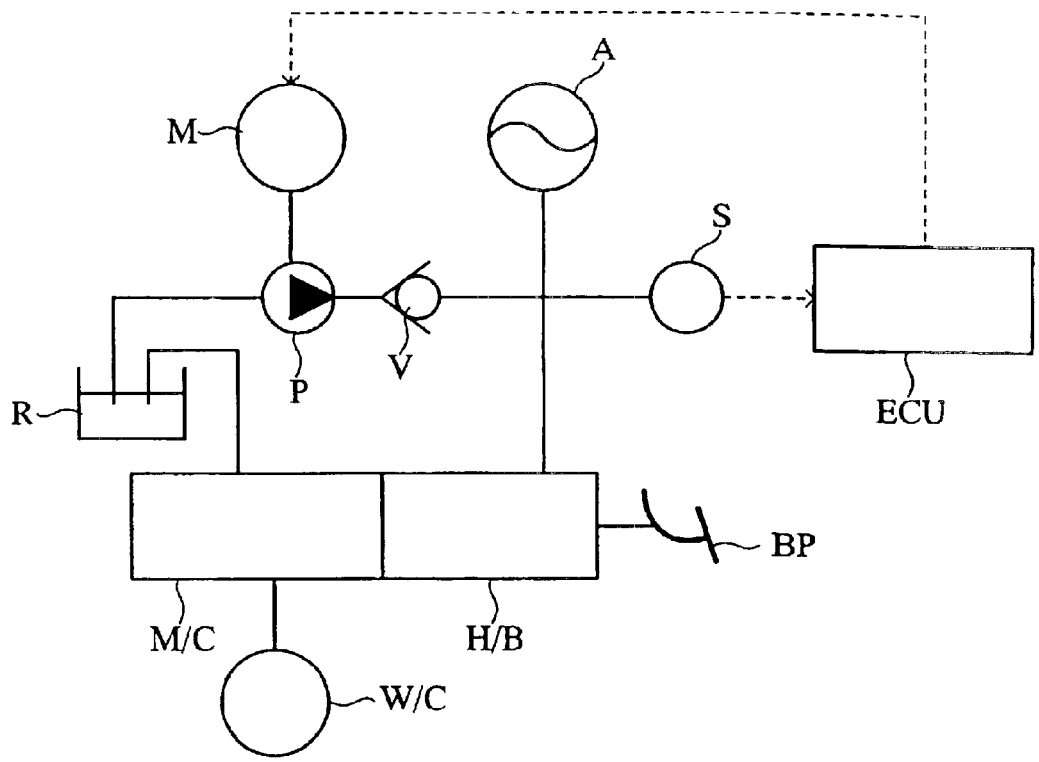
FIG. 1 is a view schematically showing a brake system of an automobile to which system a metal bellows accumulator according to an embodiment of the present invention is applied.

A preferred embodiment of the present invention will now be described with reference to the drawings. FIG. 1 schematically shows a brake system of an automobile to which a metal bellows accumulator A according to the present invention is applied. In the present embodiment, a pressurized liquid from a hydraulic pump P driven by an electric motor M is accumulated in the hydraulic accumulator A via a check valve V, and is then supplied to a hydraulic booster H/B, which is operable in response to depression of a brake pedal BP, and is used to produce assist pressure for a master cylinder M/C.

Further, in the present embodiment, the hydraulic pump P is connected to a reservoir R; and the master cylinder M/C is connected to both the reservoir R and a wheel cylinder W/C. The driving of the electric motor M is controlled by an electric control unit ECU in accordance with a signal from a pressure sensor S, which detects the pressure of the pressurized liquid accumulated in the hydraulic accumulator A when an ignition switch is turned ON (hereinafter this state may be referred to as an ignition ON state). Specifically, driving of the electric motor M is stopped when the pressure of the pressurized liquid reaches a pump OFF pressure, and is resumed when the pressure of the pressurized liquid drops to a pump ON pressure.

Figure 2:
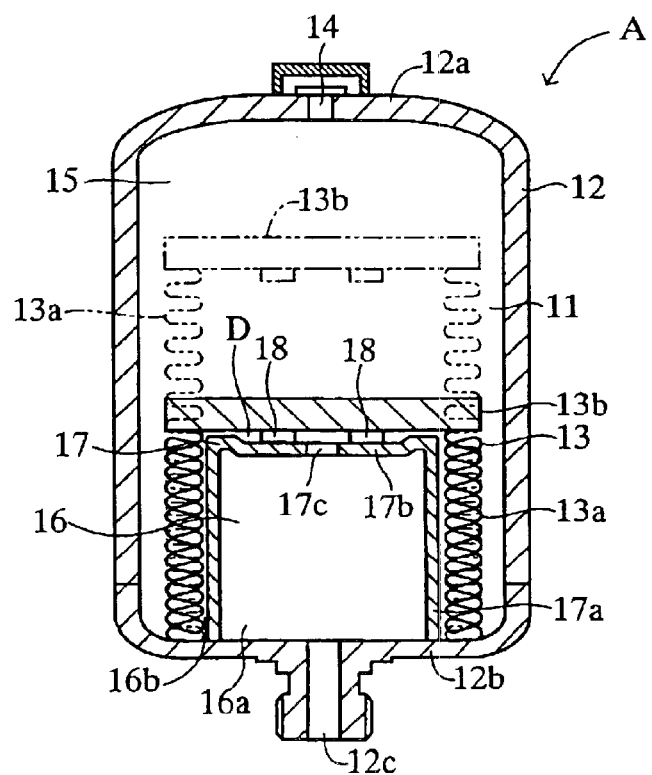
FIG. 2 is a cross-sectional view of the hydraulic accumulator of FIG. 1, showing the hydraulic accumulator accumulating no pressurized liquid.

As shown in FIG. 2, the hydraulic accumulator A includes a main shell 12 defining a pressure space 11, and a metallic bellows unit 13 disposed within the pressure space 11. The main shell 12 is constituted by upper and lower shell halves, which are joined together in a liquid-tight state. A plug 14 is fitted in an airtight manner in a gas filling port formed in an upper end wall 12a of the main shell 12.

The metallic bellows unit 13 is constituted by a cylindrical, tubular bellows portion 13a made of a metal, and a movable plate 13b made of a metal. The movable plate 13b is connected in an airtight and liquid-tight state to an upper end of the bellows portion 13a. A lower end of the bellows portion 13a is fixed in an airtight and liquid-tight state to a lower end wall 12b of the main shell 12. Thus, the pressure space 11 is sectioned into an outer chamber serving as a gas chamber 15 in which a pressurized gas of a preset pressure (i.e., a pressure of 2 to 9 MPa) is enclosed, and an inner chamber serving as a liquid chamber 16 communicating with a liquid port 12c formed in the lower end wall 12b of the main shell 12.

An auxiliary shell 17 is disposed inside the bellows unit 13; namely, inside the liquid chamber 16. Four rubber plates 18 are fixedly attached to a lower surface of the movable plate 13b at regular intervals along the circumference of the movable plate 13b in order to absorb a possible impact between the auxiliary shell 17 and the movable plate 13b and in order to form a gap D therebetween (FIGS. 3 and 4) when the movable plate 13b comes into contact with the auxiliary shell 17.

The auxiliary shell 17 also serves as a stopper for limiting collapsing movement of the metallic bellows unit 13 whose free form is indicated by imaginary lines in FIG. 2. The auxiliary shell 17 has a cylindrical, tubular wall portion 17a and a bottom wall portion 17b provided at the upper end of the tubular wall portion 17a. A lower end of the tubular wall portion 17a of the auxiliary shell 17 is fixedly joined to the lower end wall 12b of the main shell 12. The auxiliary shell 17 sections the liquid chamber 16 within the bellows unit 13 into an inner liquid chamber portion 16a with which the liquid port 12c communicates and is to which the liquid port 12c is exposed, and an outer liquid chamber portion 16b to which an inner circumferential surface of the bellows portion 13a of the metallic bellows unit 13 is exposed.

The inner liquid chamber portion 16a always communicates with the outer liquid chamber portion 16b via a communication passage, which is constituted by the above-mentioned gap D and a communication passage hole 17c, which is formed in the bottom wall portion 17b of the auxiliary shell 17. Accordingly, the pressure of the pressurized liquid supplied to the liquid port 12c via the check valve V from the hydraulic pump P of FIG. 1 acts on the movable plate 13b over its entire area except for the rubber plates 18, to thereby push the movable plate 13b upward in FIG. 2, thus guaranteeing smooth expansion of the metallic bellows unit 13.

Figure 5:
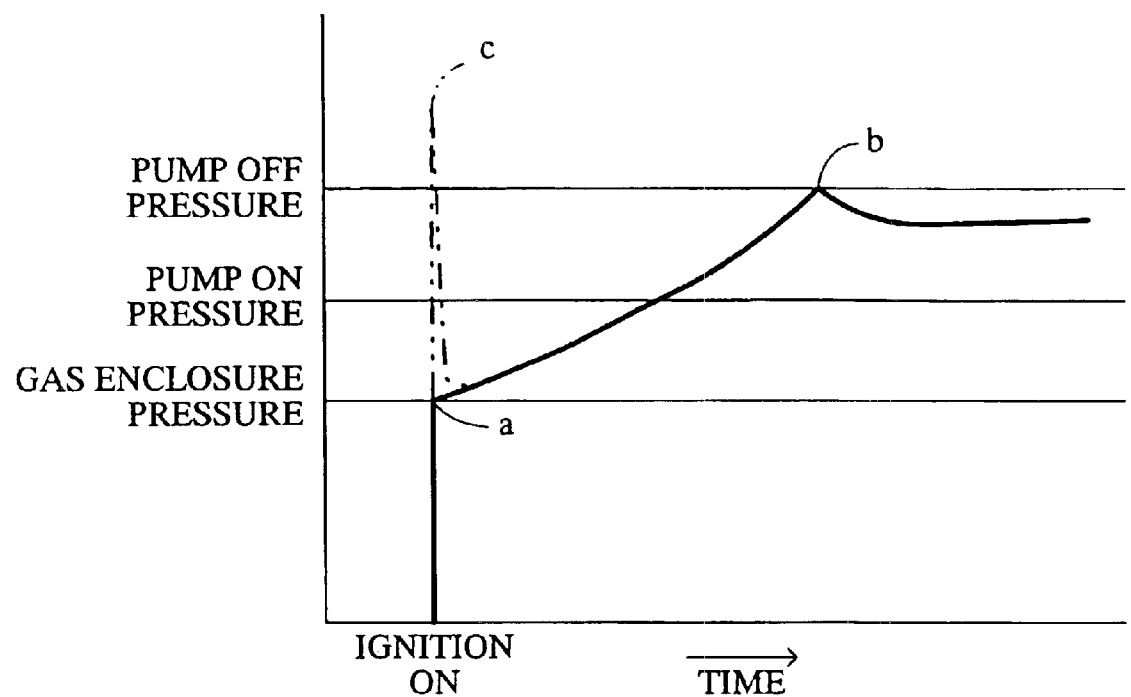
FIG. 5 is a diagram to be used for explaining the operation of the brake system when a pressurized liquid is accumulated in the hydraulic accumulator of FIG. 1.

In the thus-constructed hydraulic accumulator A of the present embodiment, when driving of the electric motor M is started in response to turn ON of the ignition switch, the pressure of the pressurized liquid accumulated in the hydraulic accumulator A increases toward point b via point a as shown in FIG. 5. During the transition of the pressure from point a to point b in FIG. 5, in the hydraulic accumulator A, the metallic bellows unit 13 expands from the posture indicated by solid lines to the posture indicated by imaginary lines in FIG. 2.

Further, when the pressure of the pressurized liquid accumulated in the hydraulic accumulator A reaches the pump OFF pressure and thus reaches point b, the driving of the electric motor M is stopped, whereupon the pressure of the pressurized liquid drops toward the pump ON pressure. This drop of pressure occurs, for example, because the pressurized liquid accumulated in the hydraulic accumulator A leaks via the check valve V, etc. or is supplied to the hydraulic booster H/B and used thereby. At that time, the metallic bellows unit 13 collapses toward the posture indicated by the solid lines in FIG. 2. Notably, when the pressure of the pressurized liquid accumulated in the hydraulic accumulator A drops to the pump ON pressure, the driving of the electric motor M is restarted, whereupon the pressure of the pressurized liquid increases toward the pump OFF pressure.

In the hydraulic accumulator A of the present embodiment, because the auxiliary shell 17 serving as a stopper for limiting collapsing movement of the metallic bellows unit 13 is disposed within the liquid chamber 16, overcollapsing of the metallic bellows unit 13 is prevented, so that possible lowering of the life of the metallic bellows unit 13 can be suppressed, thereby securing a required life of the metallic bellows unit 13.

Further, because the outer liquid chamber portion 16b to which the inner circumferential surface of the bellows portion 13a of the metallic bellows unit 13 is exposed always communicates with the liquid port 12c via the communication passage hole 17c and the gap D, it is unnecessary to employ a sealing structure (e.g., a sealing structure in which, in place of the four rubber plates 18, an annular sealing member is fixedly attached to the lower surface of the movable plate 13b) such that the atmospheric pressure does not act on the inner side of the bellows portion 13a of the metallic bellows unit 13. Accordingly, in any case, no sealing member is fixedly seated in the seal seat (i.e., the upper surface of the auxiliary shell 17) in the sealing structure and, therefore, the metallic bellows unit 13 is allowed to expand smoothly so that, so long as the pressurized liquid is accumulated in the liquid chamber 16 in less than a predetermined amount, the pressure of the pressurized liquid does not reach the pump OFF pressure (a preset upper threshold). As a result, the hydraulic accumulator A can accumulate the pressurized liquid reliably.

Notably, if the sealing member is fixedly seated in the seal seat in the above-described sealing structure, when driving of the electric motor M is started in response to turn ON of the ignition switch, the metallic bellows unit 13 of the hydraulic accumulator A encounters difficulty in expanding from the posture indicated by solid lines in FIG. 2, and the pressure of the pressurized liquid accumulated in the hydraulic accumulator A sharply increases toward point c via point a as indicated by imaginary lines in FIG. 5. Therefore, when only a small amount of pressurized liquid has been accumulated in the liquid chamber 16, the pressure of the pressurized liquid reaches the pump OFF pressure to thereby stop the driving of the electric motor M so that the pressurized liquid cannot be reliably accumulated in the hydraulic accumulator A. Therefore, there would be a fear that the pressurized liquid might be unable to be supplied to the hydraulic booster H/B from the hydraulic accumulator A at the beginning of the ignition ON state.

Further, in the hydraulic accumulator A of the present embodiment, because the gas pressure (i.e., the gas pressure when the metallic bellows unit 13 assumes the posture indicated by solid lines in FIG. 2) of the gas chamber 15 is set within a range of 2 to 9 MPa, it is possible to secure not only an initial braking force (because the gas pressure is set to a value equal to or greater than 2 MPa) but also a required life of the metallic bellows unit 13 (because the gas pressure is set to a value equal to or smaller than 9 MPa), when the hydraulic accumulator A is applied to a brake system of an automobile.

Figure 3:
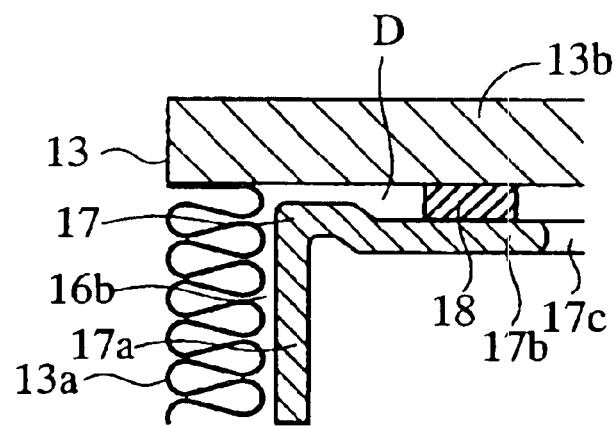
FIG. 3 is a fragmentary, enlarged cross-sectional view of FIG. 2.
Figure 4:
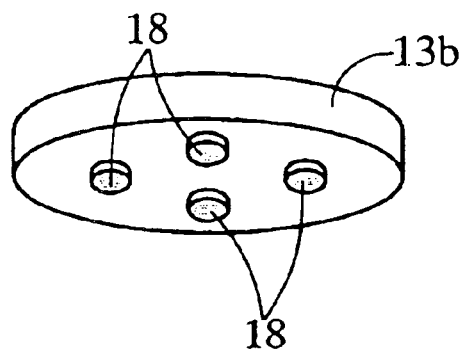
FIG. 4 is a perspective view showing a movable plate shown in FIGS. 2 and 3, and four rubber plates fixedly attached to a lower surface of the movable plate.
Figure 6:
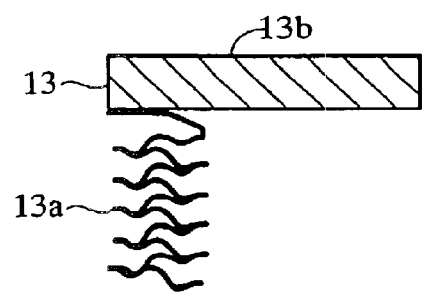
FIG. 6 is a fragmentary cross-sectional view showing a modification of the metallic bellows unit of the metal bellows accumulator according to the embodiment of the present invention.

In the present embodiment, as shown in FIGS. 2 and 3, the metallic bellows portion 13a of the metallic bellows unit 13 includes a plurality of pleats each having a U-shaped cross section. Alternatively, as shown in FIG. 6, the metallic bellows portion 13a may include a plurality of pleats each having a S-shaped cross section.

In this alternative case, as compared with the case where the bellows portion 13a of the metallic bellows unit 13 includes a plurality of pleats each having a U-shaped cross section, a minimum pitch (i.e., a pitch when the bellows portion 13a is collapsed) of the pleats of the bellows portion 13a of the metallic bellows unit 13 can be reduced and, therefore, the hydraulic accumulator A can be manufactured compactly.

Obviously, numerous modifications and variations of the present invention are possible in light of the above teachings. It is therefore to be understood that within the scope of the appended claims, the present invention may be practiced otherwise than as specifically described herein.

What is claimed is:

1. A metal bellows accumulator comprising a shell which defines a pressure space, and a metallic bellows unit which is disposed within the pressure space of the shell and whose one end is fixedly secured to an end wall of the shell, the metallic bellows unit sectioning the pressure space into an outer chamber serving as a gas chamber in which a pressurized gas is enclosed, and an inner chamber serving as a liquid chamber which communicates with a liquid port formed in the end wall of the shell and in which a pressurized liquid is to be accumulated via the liquid port, characterized in that a stopper is disposed within the liquid chamber for limiting collapsing movement of the metallic bellows unit, the stopper is constituted by a bottomed tubular member having an open end fixed to the end wall of the shell and a bottom wall which engages a plate portion of the metallic bellows unit so as to limit collapsing movement of the metallic bellows unit, the tubular member sectioning the liquid chamber into an inner liquid chamber portion communicating with the liquid port and an outer liquid chamber portion to which an inner circumferential surface of a bellows portion of the metallic bellows unit is exposed; and the inner liquid chamber portion always communicates with the outer liquid chamber portion via a communication passage hole which is formed in the bottom wall of the tubular member.

2. A metal bellows accumulator according to claim 1, wherein a rubber member is disposed between the plate portion of the metallic bellows unit and the bottom wall of the tubular member, the rubber member being configured and arranged in order to maintain the connection between the inner liquid chamber portion and the outer liquid chamber portion even when the plate portion of the metallic bellows unit comes into contacts with the bottom wall of the tubular member.

3. A metal bellows accumulator according to claim 1, wherein a pressure of the pressurized gas enclosed in the gas chamber is set within a range of 2 to 9 MPa.

4. A metal bellows accumulator according to claim 1, wherein the bellows of the metallic bellows unit includes a plurality of pleats each having a S-shaped cross section.

5. A metal bellows accumulator according to claim 2, wherein a pressure of the pressurized gas enclosed in the gas chamber is set within a range of 2 to 9 MPa.

6. A metal bellows accumulator according to claim 2, wherein the bellows portion of the metallic bellows unit includes a plurality of pleats each having a S-shaped cross section.

7. A metal bellows accumulator according to claim 3, wherein the bellows portion of the metallic bellows unit includes a plurality of pleats each having a S-shaped cross section.

8. A metal bellows accumulator according to claim 5, wherein the bellows portion of the metallic bellows unit includes a plurality of pleats each having a S-shaped cross section.

* * * * *